United States Patent [19]

DeCesare et al.

[11] Patent Number: 5,038,145
[45] Date of Patent: Aug. 6, 1991

[54] CONSTANT FALSE ALARM RATE WITH LOW PROBABILITY OF FALSE ALARMS

[75] Inventors: Peter A. DeCesare, Columbia; Michael J. Hodges, Lithicum; David W. Goetze, Baltimore, all of Md.

[73] Assignee: Westinghouse Electric Corp., Pittsburgh, Pa.

[21] Appl. No.: 438,117

[22] Filed: Nov. 20, 1989

[51] Int. Cl.$^5$ .............................................. G01S 7/28
[52] U.S. Cl. ....................................... 342/93; 342/91; 342/159
[58] Field of Search .......................... 342/93, 91, 159

[56] References Cited

U.S. PATENT DOCUMENTS 4,649,394 3/1987 Minker et al. ................... 342/93 X
4,749,994 6/1988 Taylor, Jr. ........................ 342/93 X Primary Examiner—Mark Hellner
Attorney, Agent, or Firm—W. G. Sutcliff

[57] ABSTRACT

A constant false alarm rate (CFAR) circuit uses three windows for calculating mean level thresholds. In addition to a lead window and a lag window each separated from a cell of interest by a predetermined number of cells, a straddle window is used which includes the cell of interest. Each of the lead, lag and straddle windows are subjected to editing to remove three adjacent cells including the cell with the highest power level. The remaining cells are used to calculate a mean level threshold for each of the three windows. The largest of the three mean level thresholds is used, unless it is derived from the straddle window and it is significantly larger than the largest of the mean level thresholds derived from the lead and lag windows. In addition, use of the mean level threshold derived from the straddle window may be excluded for range cells associated with one or more range and azimuth.

10 Claims, 2 Drawing Sheets

CONSTANT FALSE ALARM RATE WITH LOW PROBABILITY OF FALSE ALARMS

BACKGROUND OF THE INVENTION

1. Field of the Invention

The present invention is related to digital radar systems and, more particularly, to providing a low, constant false alarm rate in such a radar system.

2. Description of the Related Art

Radar systems used for air traffic control, as well as those used for other purposes, receive echo signals from many sources, including ground clutter, such as trees, buildings, mountains, etc., birds and rainstorms, for example, as well as aircraft. Many different types of processing are applied to received radar signals to identify aircraft, which are termed targets, and ignore other echo signals. Different techniques are used to eliminate different types of unwanted echo signals. As an example of a technique for eliminating echo signals from birds, see U.S. patent application Ser. No. 07/267,091, incorporated herein by reference. One of the techniques that is used to eliminate many types of unwanted echo signals is Doppler filtering. A received radar signal may be separated into several different Doppler bands representing the strength of return at various velocities toward or away from the radiating source of the radar signals.

Typically, after Doppler filtering, the received signals in each of the Doppler bands is processed by a constant false alarm rate (CFAR) circuit to remove echo signals which are unlikely to be a target. The received signals are separated into range cells, each cell corresponding to a different distance from the radiating source. The range cells are edited to remove saturated echo signals, i.e., the power of the received signal in the range cell is above the limit of the receiver. In addition, range cells containing echo signals from another pulsed radiating source are excluded from further consideration. These range cells are identifiable due to the use of a different pulse repetition sequence by other radiating sources.

The remaining range cells are supplied to a conventional CFAR circuit. As illustrated on line A of FIG. 1, a group of cells (L), e.g., cells 14-25, received before a cell of interest (I), e.g., cell 27 form a lag window. The lag window is typically separated from the cell of interest I by at least one cell, termed a guard cell (G), e.g., cell 26. Similarly, a group of cells (D), e.g., cells 29-40, received after the cell of interest I form a lead window and are separated from the cell of interest I by another guard cell (G), e.g., cell 28.

In the CFAR circuit each of the lead and lag windows typically undergo processing to eliminate three range cells, the range cell with the highest power level and two range cells in the window which are closest thereto to enable detection of two aircraft spaced closely in range, i.e., within one window. For example, if range cell 20 has the highest power level of any of the range cells 14-25, range cells 19-21 will be edited out and the power levels of the remaining range cells 14-18 and 22-25 will be summed to produce a power sum. Similarly, if cell 25 has the highest power level of cells 14-25, cells 14-22 will be summed to produce a power sum. A mean level adjustment value is added to the power sum to produce a mean level threshold for the lag window. A mean level threshold is produced in a similar manner for the lead window containing cells 29-40.

In a conventional CFAR circuit, the greater of the mean level thresholds calculated for the lead and lag windows is compared with the power level of the cell of interest I. If the power level of the cell of interest I is greater than the mean level threshold, a target is identified as existing in the cell of interest I. Subsequently, cell 28 which had been a guard cell G, will become the cell of interest I, the windows will shift one cell to the right and the process will be repeated for the new cell of interest I.

The two-window range-averaging CFAR ordinarily provides a satisfactory false alarm rate. However, turbulent areas at the edges of severe storms and severe weather cells in the center of larger storm systems, as well as near saturating ground clutter, can cause undesirable false alarms. An example of echo signals from a localized turbulent area in a severe storm is illustrated on line B of FIG. 1. When the cell of interest I is at the center of the turbulent area, the cell of interest I and guard cells G, i.e., cells 26-28, are automatically excluded and the editing of high power level cells will exclude cells 25 and 29 in the lag and lead windows, respectively, and the two cells closest thereto, i.e., cells 23 and 24 in the lag window and cells 30 and 31 in the lead window. As a result, the mean level thresholds of the lead and lag windows will use only the range cells in cells 32-40 and 14-22, respectively, which do not contain saturation or interference, as described above. As a result, a false target likely will be generated for the cell of interest I.

SUMMARY OF THE INVENTION

An object of the present invention is to lower the false alarm rate during severe weather in an air traffic control radar system.

Another object of the present invention is to maintain the ability to detect and resolve targets while lowering the false alarm rate.

The above objects are attained by providing a method of processing range cells in radar signals, comprising the steps of: identifying a cell of interest and a lead window, a lag window and a straddle window associated therewith; calculating mean level thresholds, each mean level threshold derived from the range cells in one of the lead, lag and straddle windows; selecting one of the mean level thresholds as a target detection threshold; and comparing the cell of interest with the target detection threshold to determine whether the cell of interest contains a target. Preferably, the mean level threshold of the straddle window is used only if it is not larger than the largest of the mean level thresholds of the lead and lag windows by a predetermined straddle override threshold amount. In such circumstances, the greater of the mean level thresholds of the lead and lag windows is preferably adjusted since the number of windows being used for sampling has been reduced. If one of the mean level thresholds of the lead and lag windows is larger than the mean level threshold of the other lead and lag window and larger than the mean level threshold of the straddle window, it is used without any adjustment.

These objects, together with other objects and advantages which will subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

The present invention avoids an excessive number of false alarms by adding a third window to the conventional two-window CFAR. This window straddles the cell of interest and is thus termed a straddle window, illustrated on line A of FIG. 1 by the range cells containing "S". If the number of cells in a window is odd, the cell of interest I can be at the exact center of the straddle window, and when the straddle window has an even number of cells, the cell of interest I can be either of the two cells closest to the center of the window. In the example illustrated in FIG. 1A, all of the windows span 12 cells and the straddle window contains cells 22–33 when the cell of interest I is cell 27. The same type of editing is applied to the straddle window as the lead and lag windows. However, since the guard cells G and cell of interest I, e.g., cells 26–28, are included in the straddle window, in the situation illustrated on line B of FIG. 1, only cells 26–28 will be edited out as including the range cell with the highest power level and the two cells closest thereto. The mean level adjustment value is determined through experimentation, so that when it is added to the sum of the remaining cells 22–25 and 29–33, the mean level threshold for the straddle window will be greater than the power level of the cell of interest in the situation illustrated on line B of FIG. 1.

Preferably, the mean level adjustment value is selected from a table of adjustment values which vary depending upon the number of cells remaining after the cells containing saturation or interference and the three adjacent cells including the cell having the highest power level have been excluded. In the preferred embodiment, the table of adjustment values is two-dimensional allowing an operator to adjust the probability of false alarms.

Figure 1:
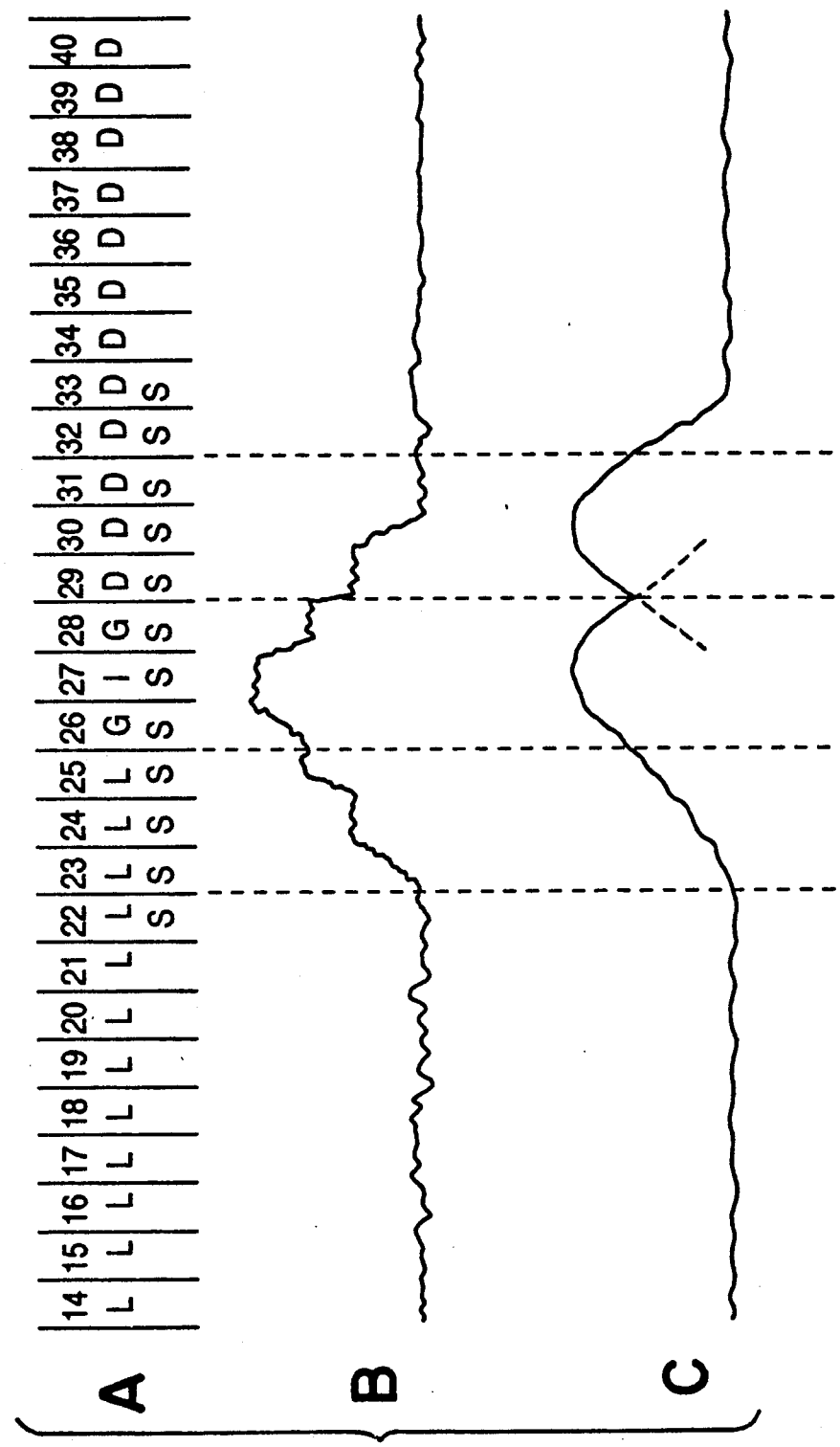
FIG. 1 is a diagram of range cells in received radar signals including two examples of power levels in received radar signals.

Under certain circumstances, the preferred embodiment does not use the straddle window to increase the likelihood that a target will be detected. For example, line C of FIG. 1 illustrates a situation where two aircraft are close to the same distance from the radiating source, as might occur in the case of parallel runways. If range cell 30 has the highest power level, range cells 29–31 will be excluded from the straddle window for the purposes of calculating the mean level threshold. The remaining range cells will include the cell of interest which will produce a mean level threshold much higher in the straddle window than in the lead and lag windows and which is higher than the power level of the cell of interest. As a result, the target in the cell of interest will not be detected.

Two techniques can be used to avoid the above-described situation. In the preferred embodiment, if the mean level threshold of the straddle window is significantly higher than the mean level thresholds of the lead and lag windows, the greater of the two "side" mean level thresholds will be used. The amount by which the "straddle" mean level threshold must exceed the larger of the side mean level thresholds, i.e., the straddle override threshold amount, is determined experimentally. The straddle override threshold must be set sufficiently high so that the situation illustrated on line B of FIG. 1 does not result in a false detection of a target, while the situation on line C of FIG. 1 prevents the straddle mean level threshold from being used. If desired, the straddle threshold amount may be adjustable by the operator using a table like that for the mean level adjustment. This allows a system according to the present invention to be installed and tested against weather conditions in the area where the system will be used, to determine an appropriate straddle override threshold amount to be used. In addition, an adjustable straddle override threshold amount permits an identical radar system, installed in an area with less severe weather patterns, to have greater resolution capability, without an increase in the false alarm rate.

In addition, range cells at a certain range and azimuth may automatically exclude use of the straddle window when they are the cell of interest. For example, in the case of parallel runways, it may be possible to identify certain range cells at a certain azimuth in which the situation illustrated on line C of FIG. 1 is likely to occur. If it is not possible to find a straddle override threshold amount which provides an acceptable false alarm rate and disables use of the straddle window in this situation, automatic disablement of the straddle window may be used for identified range/azimuth locations.

Figure 2:
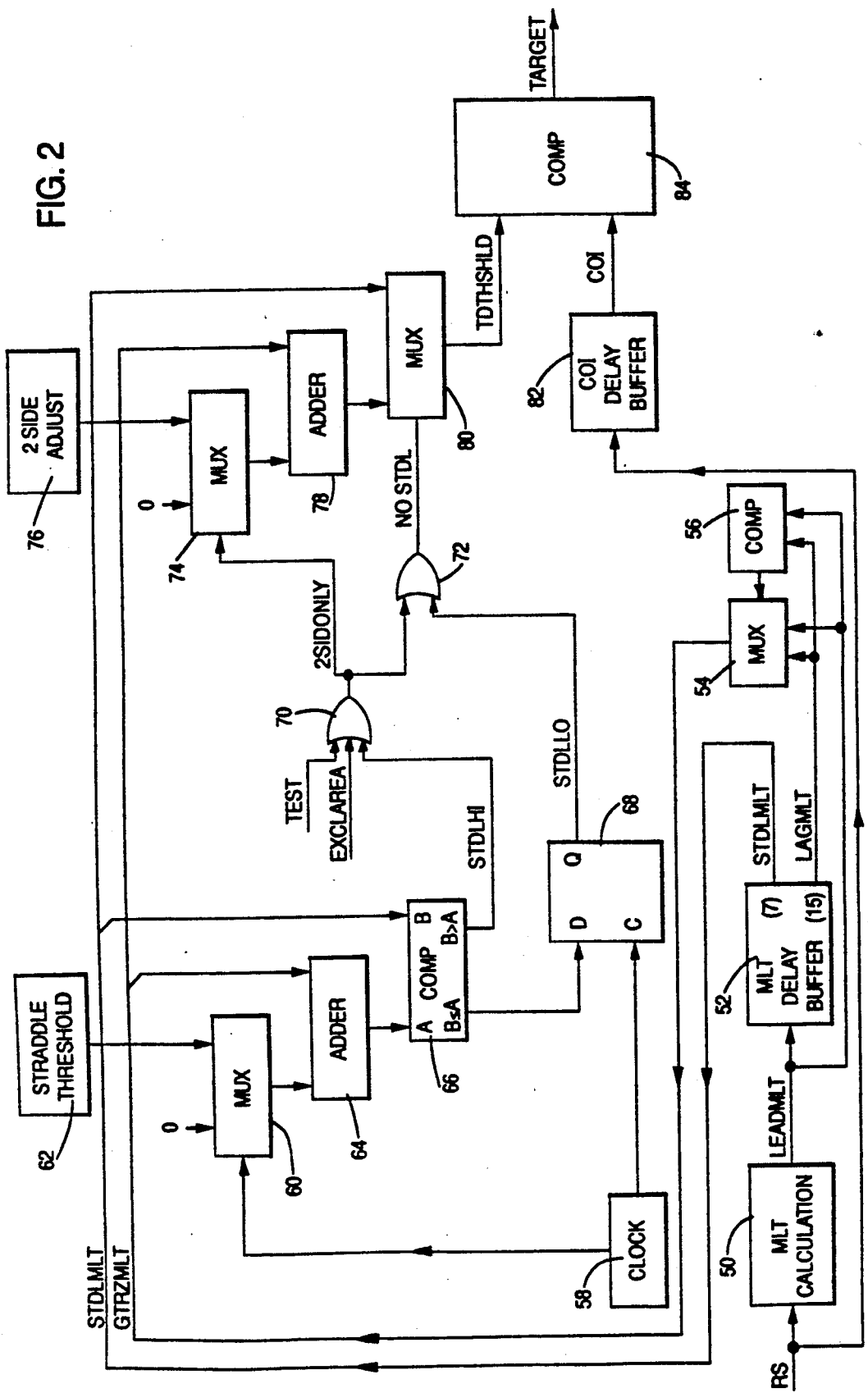
FIG. 2 is a block diagram of an apparatus according to the present invention.

The present invention may be applied as an add on to an existing two-window CFAR circuit. As illustrated in FIG. 2, radar signals RS are input into a MLT calculation circuit 50 which uses a sliding window of 12 range cells. The MLT calculation circuit 50 excludes all of the range cells in the window which have a saturated power level or contain a predetermined amount of interference from another pulsed radiating source. After excluding these range cells, the range cell having the highest power level remaining and the two range cells within the window which are closest thereto are also excluded. The MLT calculation unit 50 sums the power level of each of the range cells remaining within the window applies a the mean level adjustment value to produce the mean level threshold. Then, the 12 cell window is slid one cell and a mean level threshold for the new group of cells is calculated using the same process.

After the MLT calculation unit 50 has produced mean level thresholds for at least 15 groups of windows, the output LEADMLT from the MLT calculation unit 50 can be used as the mean level threshold for the lead window. For each of the preceding groups of range cells, the LEADMLT signal is stored in a MLT delay buffer 52. The value LAGMLT stored 15 calculations previously is output as the mean level threshold of the lag window and the value STDLMLT stored 7 calculations previously is output from the MLT delay buffer 52 as the mean level threshold of the straddle window.

The side mean level thresholds for the lead and lag windows are supplied to a multiplexer (MUX) 54 and a comparator (COMP) 56. The comparator 56 determines which of the side mean level thresholds is larger and controls the multiplexer 54 to output a signal GTR2MLT which is the larger of the two side mean level thresholds.

In the preferred embodiment, the same circuitry is used to determine whether the straddle mean level threshold (STDLMLT) is lower than the larger of the side mean level thresholds (GTR2MLT) and whether the straddle mean level threshold is larger by more than the straddle override threshold amount. A clock circuit 58 outputs clock signals having a frequency twice as fast as the MLT calculation unit produces mean level thresholds. One of the clock signals from the clock circuit 58 is supplied to a multiplexer 60 which selects between the value zero and a value output by a straddle threshold storage 62. As noted above, the straddle threshold storage 62 may be a table from which the operator of the system can select a value, based upon the conditions at the location where the radar system is installed. The output of the multiplexer 60 is supplied to an adder 64 which adds the output value to the larger of the side mean level thresholds GTR2MLT and the resulting value is compared with the straddle mean level threshold STDLMLT by comparator 66. The order in which the values are selected by the multiplexer 60 does not matter, but for purposes of discussion it will be assumed that zero is selected first.

On the first half cycle of the clock signal from clock circuit 58 to multiplexer 60, the comparator 66 compares the larger of the two side mean level thresholds GTR2MLT to the straddle mean level threshold STDLMLT. If the straddle mean level threshold is less than or equal to the larger of the side mean level thresholds GTR2MLT, a flip-flop 68 is set to output a signal STDLLO to provide an indication of this situation. If the straddle mean level threshold STDLMLT is larger than the larger of the two side mean level thresholds GTR2MLT, the signal STDLLO will be locked at a false value.

On the second half cycle of the clock signals from clock circuit 58, the comparator 66 compares the straddle mean level threshold STDLMLT with the sum of the straddle override threshold amount and the larger of the two side mean level thresholds GTR2MLT. The flip-flop 68 receives a clock signal to prevent the output STDLLO from changing. If the straddle mean level threshold STDLMLT is greater than the sum output by the adder 64, an OR gate 70 outputs a signal 2SI-DONLY which causes an OR gate 72 to output a signal NOSTDL. In addition, a multiplexer 74 selects the output of a two side adjustment storage 76 in response to the 2SIDONLY signal. The value output by the two side adjustment storage 76 is added by an adder 78 to the larger of the two side mean level thresholds GTR2MLT to account for the reduced number of windows which are being included, as described above. The resulting sum is selected by a multiplexer 80 which receives the NOSTDL signal from OR gate 72. The output of the multiplexer 80 is the target detection threshold TDTHSHLD.

There are several other ways to have the same values of the 2SIDONLY and NOSTDL signals. OR gate 70 also receives a test signal TEST which can force the 2SIDONLY signal to be true. In addition, OR gate 70 may receive a signal EXCLAREA indicating that the range and azimuth of the cell of interest is within an exclusion area where the straddle mean level threshold is not to be used. This signal also causes the 2SI-DONLY signal to be true.

If, during the second half cycle of the clock signals output by clock circuit 58 the comparator 66 determines that the straddle mean level threshold STDLMLT is less than the sum of the straddle override threshold amount and the larger of the two side mean level thresholds GTR2MLT, the STDLHI signal will be false. Assuming that the straddle mean level threshold STDLMT was larger than the GTR2MLT signal during the first half cycle and neither the TEST nor EX-CLAREA signals are true, the multiplexer 80 will select the straddle mean level threshold STDLMLT to be output as the target detection threshold TDTHSLD.

If, during the first half cycle of the clock signals output by the clock circuit 58 the comparator 66 determines that the straddle mean level threshold STDLMLT is smaller than the larger of the two mean level thresholds GTR2MLT, the STDLLO signal output by the flip-flop 68 will be true. During the second half cycle, the STDLHI signal will be false, since the straddle override threshold amount is a positive number. Therefore, provided the TEST and EXCLAREA signals are false, the 2SIDONLY signal output by OR gate 70 will be false. Thus, multiplexer 74 will output the value zero to be added to the GTR2MLT signal by adder 78 and the NOSTDL signal output by OR gate 72 will be true since STDLLO is true. Therefore, multiplexer 80 will output the larger of the side mean level thresholds GTR2MLT as the target detection threshold TDTHSHLD.

As illustrated in FIG. 2, the power level of the cell of interest COI can be provided by delaying the received radar signals RS in a COI delay buffer 82. The power level of the cell of interest COI is compared by a comparator 84 with the target detection threshold TDTHSHLD to output a signal indicating whether a target is located in the cell of interest.

The many features and advantages of the present invention are apparent from the detailed specification, and thus it is intended by the appended claims to cover all such features and advantages of the method and apparatus which fall within the true spirit and scope of the invention. Further, since numerous modification and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method of processing range cells in radar signals, comprising the steps of:
    (a) identifying a cell of interest and a lead window, a lag window and a straddle window, associated therewith;
    (b) calculating mean level thresholds, each mean level threshold derived from the range cells in one of the lead, lag and straddle windows, excluding at least one range cell in each of the lead, lag and straddle windows having a power level higher than all of the range cells therein included in said calculating;
    (c) selecting one of the mean level thresholds calculated in step (b) as a target detection threshold; and
    (d) comparing the cell of interest with the target detection threshold to determine whether the cell of interest contains a target.

2. A method of processing range cells in radar echo signals produced by a radiating source, comprising the steps of:
    (a) identifying a predetermined number of the range cells located a predetermined distance from a cell of interest in a straddle window for each of lead and lag windows;

United States Patent Office

PTO – BOYERS, PA Duty Station

MISSING PAGE TEMPORARY NOTICE

PATENT # 5038145     FOR ISSUE DATE 8-6-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 7 TO End

N/A AT Boyers
5-3-1993

Data Conversion Operation
Boyers, Pa